Nov. 7, 1933.                J. MAINLAND                1,934,198
                            CONTROL DEVICE
                        Filed March 9, 1931          3 Sheets-Sheet 1
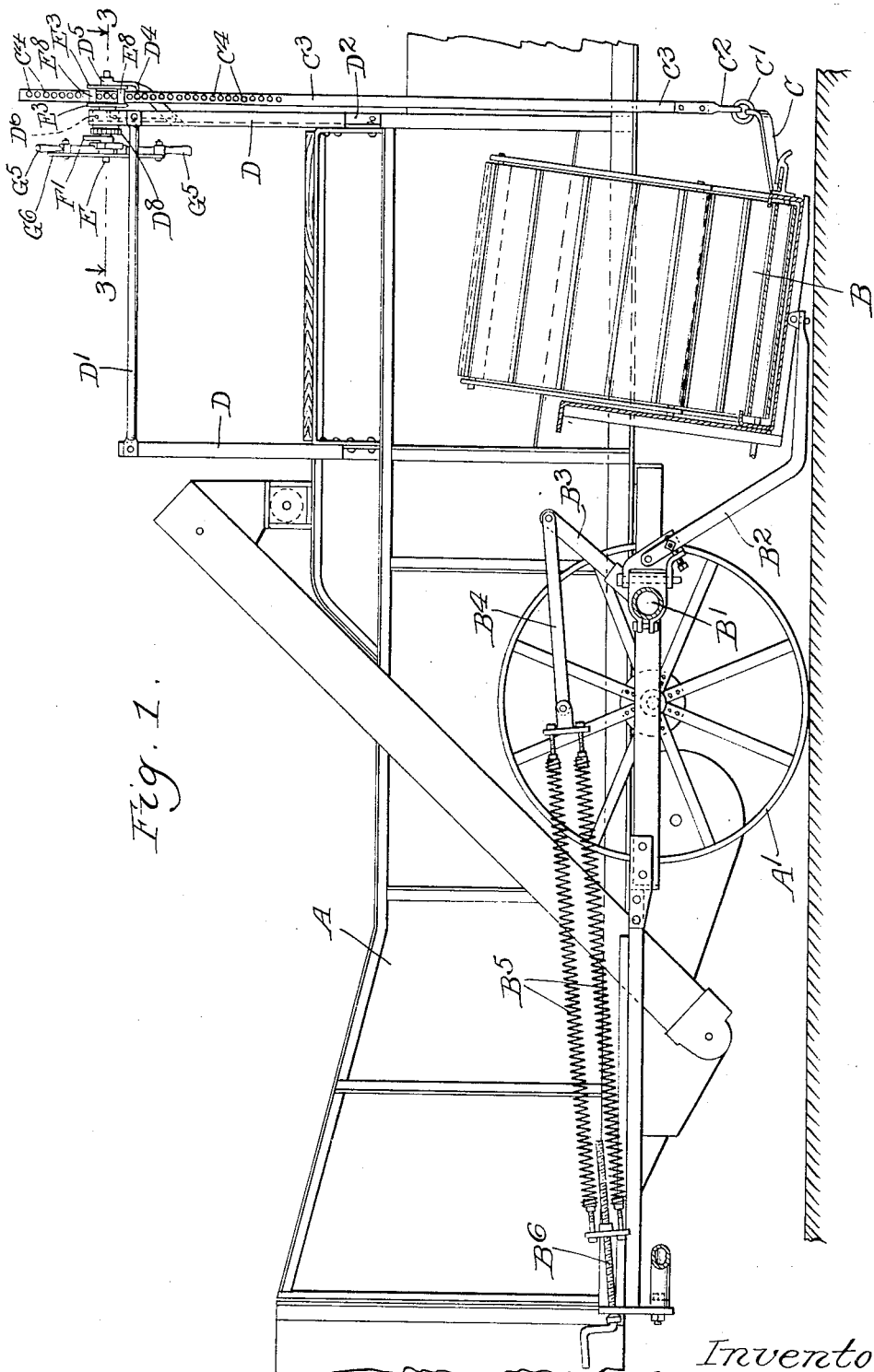
Inventor
John Mainland
by Parker & Carter
Attorneys

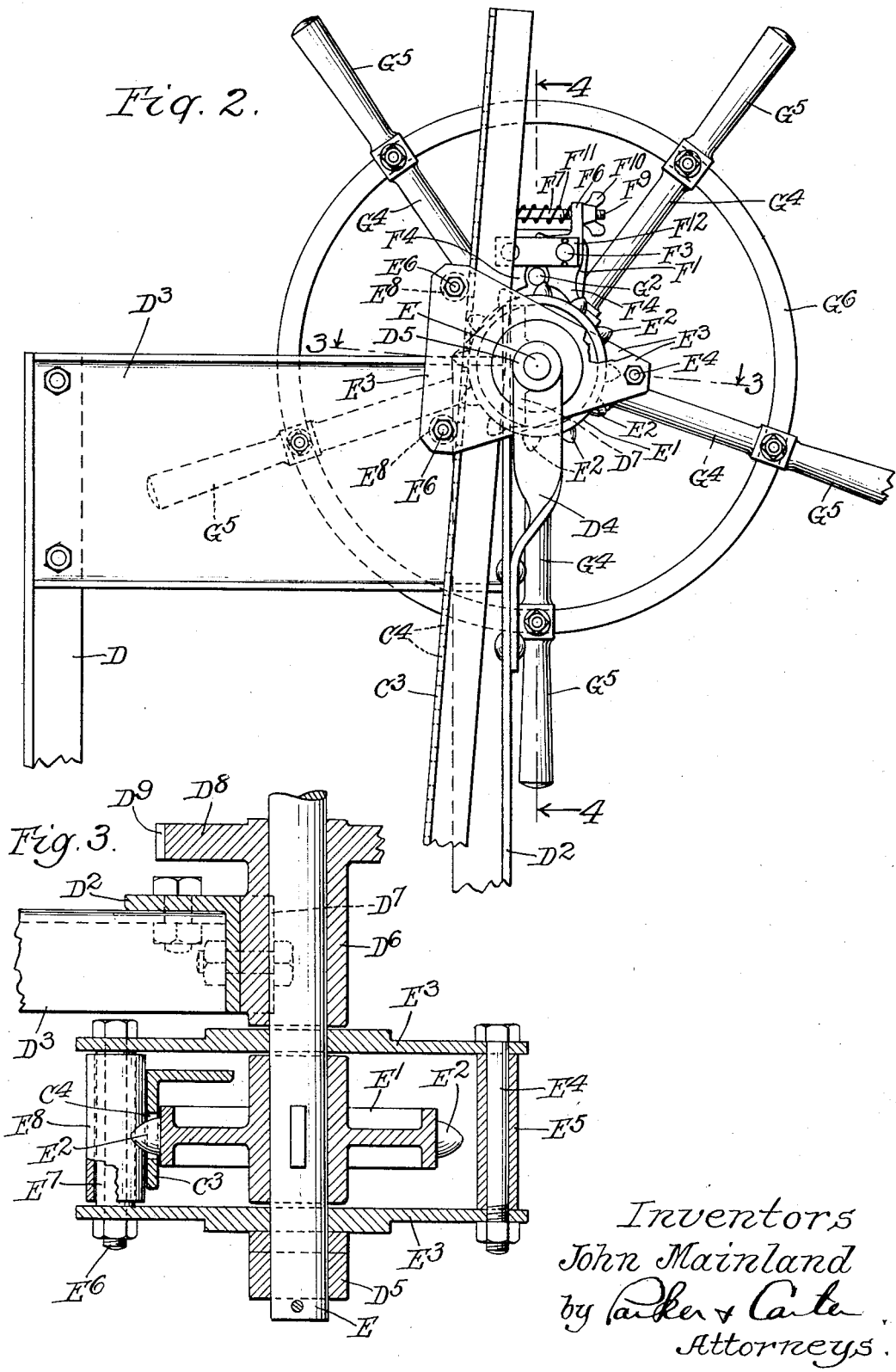

Nov. 7, 1933.         J. MAINLAND         1,934,198
CONTROL DEVICE
Filed March 9, 1931        3 Sheets-Sheet 3
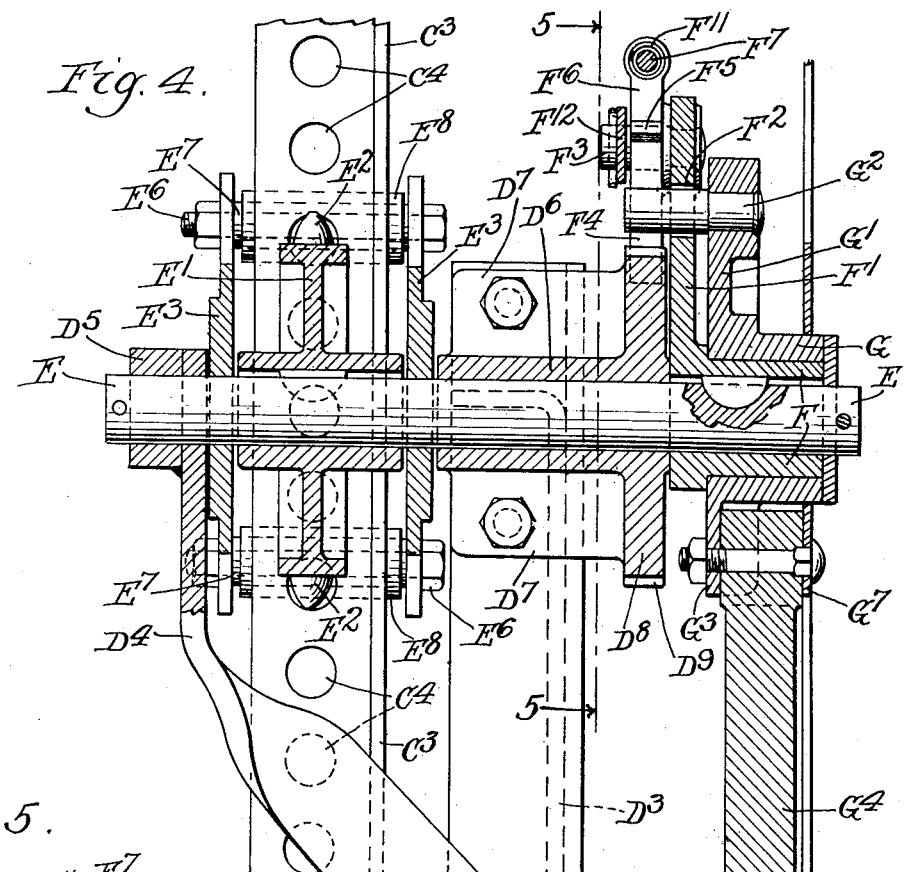
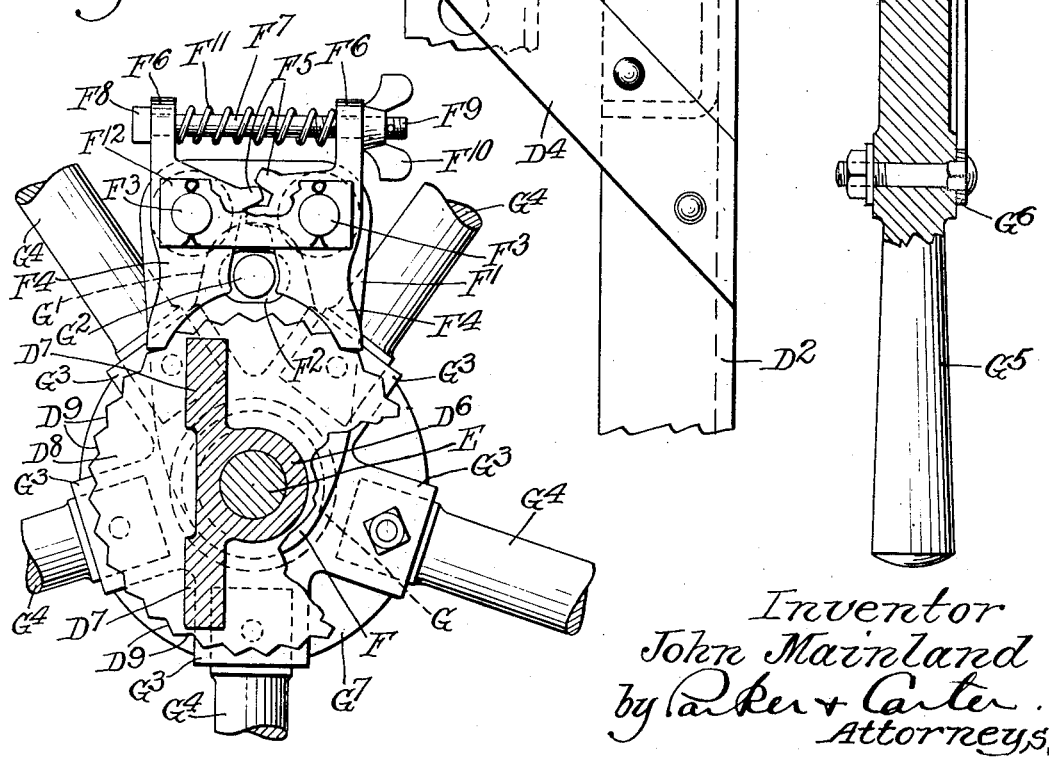
Inventor
John Mainland
by Parker + Carter
Attorneys.

Patented Nov. 7, 1933

1,934,198

UNITED STATES PATENT OFFICE 1,934,198

CONTROL DEVICE

John Mainland, La Porte, Ind., assignor, by mesne assignments, to Allis-Chalmers Manufacturing Company, a corporation of Delaware Application March 9, 1931. Serial No. 521,192

10 Claims. (Cl. 192—8)

This invention relates to a control device, particularly adapted for use in connection with agricultural machinery, in which parts are mounted for adjustment.

It is one of the objects of the invention to provide an adjusting device which may be operated by one hand and which has an automatic locking arrangement so that it will automatically remain in any position to which it is moved. Another object is, therefore, to provide in connection with a control device, means for operating it which can be operated in either direction by one hand of the operator and which will automatically hold or lock itself in the adjusted position.

Other objects will appear from time to time in the specification and claims.

My invention is illustrated more or less diagrammatically in the accompanying drawings, wherein—

Figure 1 is a side elevation of a combine with a header attachment mounted upon it, the header being shown in section;

Figure 2 is a fragmentary elevation showing the hand wheel and a portion of the control device;

Figure 3 is a transverse horizontal cross section, taken at line 3—3 of Figures 1 and 2;

Figure 4 is a longitudinal vertical cross section, taken at line 4—4 of Figure 2;

Figure 5 is a transverse vertical cross sectional detail, taken at line 5—5 of Figure 4.

Like parts are designated by like characters throughout the specification and drawings.

A indicates a combine, having one or more supporting wheels $A^1$.

B is a header frame assembly carried from a support $B^1$ upon one or more arms $B^2$. Connected to the arms $B^2$ is a lever $B^3$ which, by means of a link $B^4$, is fastened to springs $B^5$, which are adjustable supported as at $B^6$ upon the frame of the combine. The springs act as a counter-balance, to carry or balance some of the weight of the header assembly.

Extending forwardly from the header frame assembly is a lever C, which carries a ring $C^1$ in its outer end. A member $C^2$ is fastened to the ring and is itself fastened to an adjusting member $C^3$, which is preferably of angular cross section and carries perforations $C^4$. When the member $C^3$ is moved up or down, the header frame assembly is raised or lowered.

Extending upwardly from the combine frame are frame members D, D, which may be joined at their upward ends by a brace $D^1$. They are spaced front to rear with respect to each other. $D^2$ is a frame member spaced laterally from the front frame member D and joined to it by a flanged plate $D^3$. Extending forwardly from the member $D^2$ is a bracket $D^4$, which is perforated and carries a bearing $D^5$. Mounted at the upper end of the member $D^2$ is a bearing $D^6$, which has laterally extending ears $D^7$ which are attached to the member $D^2$ and which has also a laterally extending flange $D^8$, the outer edge of which is notched or roughened as at $D^9$, as indicated particularly in Figures 4 and 5.

Journaled in the bearings $D^5$ and $D^6$ is a shaft E. A sprocket wheel $E^1$ is keyed on the shaft E. The sprocket carries at its outer end teeth $E^2$ which are adapted to mesh with the member $C^3$ and penetrate within the perforations $C^4$ in it. Positioned about the shaft E and about the sprocket $E^1$ is a frame formed of the two generally triangular members $E^3$, $E^3$, which are joined at one end by a bolt $E^4$ about which is positioned a spacing member $E^5$ and which are joined at their other corners by bolts $E^6$, $E^6$ about each of which is positioned a spacing member or tube $E^7$. Upon each of the spacing tubes $E^7$ is positioned a roller $E^8$. The member $C^3$ bears against the rollers $E^8$, as indicated particularly in Figures 2 and 3, and they thus serve as antifriction members for it.

Keyed upon the shaft E, preferably adjacent one end and preferably adjacent the flange $D^8$, is a hub portion F which carries an upwardly extending bracket portion $F^1$, which is slotted as at $F^2$ and which carries a pair of bearing pins $F^3$, $F^3$. Each of these pins supports a dog $F^4$, which dogs are geared together by small teeth $F^5$, as indicated in Figure 5. Each of the dogs has an upwardly extending perforated ear $F^6$ through which a rod $F^7$ passes. The rod is provided at one end with an enlarged head $F^8$ and at the other is threaded as at $F^9$ to receive an adjusting thumb nut $F^{10}$. $F^{11}$ is a compression spring pivoted about the rod $F^7$ and bearing at each end against one of the ears $F^6$ and tending to force them apart. $F^{12}$ is a supporting plate positioned upon the pins $F^3$.

Mounted upon and adapted to turn about the hub portion F is a hub G. Extending upwardly from the hub is a member $G^1$ which carries a pin $G^2$ which extends into the slot $F^2$ in the member $F^1$ and lies between the dogs $F^4$, in the position indicated particularly in Figures 4 and 5. The hub portion G is provided with a plurality of sockets $G^3$ within which spokes $G^4$ may be fastened. Each of the spokes preferably terminates in a handle G⁵ and each of them is fastened to the aligning and strengthing rings G⁶, G⁷.

It will be realized that whereas I have herewith shown and described a practical operative device, nevertheless many changes might be made in the size, shape, number and disposition of parts, without departing from the spirit of my invention and I wish, therefore, that my showing be taken as in a sense diagrammatic.

The use and operation of my invention are as follows:

The arrangement of the parts is such that they are automatically locked against motion whenever the hand wheel is not being positively moved. When it is free to do so, the spring F¹¹ expands, forcing the dogs inwardly so that their ends engage the notches D⁹ of the flange D⁸ and since this flange is fixed, the engagement of the dogs with it prevents rotation of the shaft and thus prevents movement of the member C³. With the parts in the position shown, when it is desired to change the adjustment of the header assembly, that is, to move the member C³ up or down, it is necessary to rotate the sprocket E¹ which engages the member C³. This is done as follows: The hand wheel is rotated. The pin G² of the hand wheel will contact one of the dogs F⁴, thus moving it against the opposition of the spring F¹¹ out of engagement with the notched flange D⁹. This movement serves to move both of the dogs out of engagement because they are geared together. In some forms of my invention the dogs will not be geared together. However, movement of the pin G² in the direction in which it is desired to rotate the hand wheel, disengages the dog, which prevents rotation in that direction and the other dog, whether or not the two are geared together, will merely ride over the notches D⁹. With the dog moved out of locking engagement with the notches D⁹, the shaft E is free to rotate and in its rotation it carries with it the sprocket E¹, which engages, by means of its teeth E², the perforations C⁴ in the member C³ and thus moves that member up or down in accordance with the direction of rotation of the shaft E. When the header frame has been moved to the desired position, the hand wheel is released and thus, since it is no longer being positively moved, the pin G² is no longer being forced positively against either of the dogs and the spring F¹¹ is then free to force them into engaging position with the notches D⁹. They thus engage the notches and since the flange D⁸, in which the notches are formed, is fixed, further rotation of the shaft E is prevented and when the shaft is locked against movement, the other parts are locked against movement and the header frame assembly is held in position until the hand wheel is again positively manipulated.

A platform, which has not been particularly described, is normally provided for an operator to stand upon when operating the raising and lowering mechanism. This may, of course, be of any suitable design and is used merely as a matter of convenience.

I claim:

1. In combination with a shaft, means for rotating the same and for holding it against rotation, said means including a hub, fixed to said shaft, a bracket projecting from said hub, carrying a dog, a fixed member adjacent said dog, positioned to be engaged by it, a part adapted, when free to do so, automatically to hold said dog in engagement with said fixed member, and a shaft turning means, in the initial stages of its movement directly engaging and unlatching said dog and in subsequent portions of its movement causing rotation of the shaft.

2. In combination with a shaft, means for rotating the same and for holding it against rotation, said means including a hub, fixed to said shaft, a bracket projecting from said hub, carrying a dog, a fixed member adjacent said dog, positioned to be engaged by it, a part adapted, when free to do so, automatically to hold said dog in engagement with said fixed member, and a shaft turning means, in the initial stages of its movement to direct engaging and unlatching said dog and in subsequent portions of its movement contacting said bracket to rotate it and with it the hub and the shaft.

3. In combination with a shaft, means for rotating the same and for holding it against rotation, said means including a hub, fixed to said shaft, a bracket projecting from said hub, carrying a dog, a fixed member adjacent said dog, positioned to be engaged by it, a part adapted, when free to do so, automatically to hold said dog in engagement with said fixed member, and a shaft turning means provided with a member, in the initial stages of its movement, directly engaging and unlatching said dog and in subsequent portions of its movement causing rotation of the shaft.

4. In combination with a shaft, means for rotating the same and for holding it against rotation, said means including a hub fixed to said shaft, a bracket projecting from said hub, provided with a slot and carrying a pair of dogs, a fixed member adjacent said dogs, positioned to be engaged by them, a part adapted, when free to do so, automatically to hold said dogs in engagement with said fixed member, a shaft turning means in the initial stages of its movement directly engaging and unlatching one or the other of said dogs and in subsequent portions of its movement causing rotation of the shaft, and means associated with said dogs whereby each of said dogs is unlatched through the unlatching action of the other.

5. In combination with a shaft, means for rotating the same and for holding it against rotation, said means including a hub, fixed to said shaft, a bracket projecting from said hub, carrying a dog, a fixed member adjacent said dog, positioned to be engaged by it, a part adapted, when free to do so, automatically to hold said dog in engagement with said fixed member, and a shaft turning means mounted about said hub, provided with a member in the initial stages of its movement engaging and unlatching said dog and in subsequent portions of its movement contacting said bracket to rotate it and with it the hub and the shaft.

6. In combination with a shaft, means for rotating the same and for holding it against rotation, said means including a hub, fixed to said shaft, a bracket projecting from said hub, provided with a slot and carrying a pair of dogs, a fixed member adjacent said dogs, positioned to be engaged by them in latching position, means for biasing both of said dogs to latching position in engagement with said fixed member and for insuring movement of one dog by the other when actuated to unlatching position, and a shaft turning means, provided with a member, in the initial stages of its movement, to cause unlatching of said dogs and in subsequent portions of its movement to contact said bracket to rotate it and with it the hub and the shaft.

7. In combination with a shaft, means for rotating the same and for holding it against rotation, said means including a member mounted adjacent said shaft and carrying a plurality of dogs, a fixed member adjacent said dogs positioned to be engaged by them, a shaft turning means carrying a member adapted when moved to engage one of said dogs, the dogs being geared together to move in unison, whereby when one is moved, both move.

8. In combination with a shaft, means for rotating the same and for holding it against rotation, said means including a hub, fixed to said shaft, a bracket projecting from said hub, carrying a plurality of dogs geared together to move in unison, a fixed member adjacent said dogs, positioned to be engaged by them, a part adapted, when free to do so, automatically to hold said dogs in engagement with said fixed member, and a shaft turning means mounted about said hub, adapted in the initial stages of its movement to engage and unlatch said dogs and in subsequent portions of its movement to rotate the shaft.

9. In combination with a shaft, means for rotating the same and for holding it against rotation, said means including a hub, fixed to said shaft, a bracket projecting from said hub, carrying a plurality of dogs geared together to move in unison, a fixed member adjacent said dogs, positioned to be engaged by them, a part adapted, when free to do so, automatically to hold said dogs in engagement with said fixed member, and a shaft turning means adapted, in the initial stages of its movement, to engage and unlatch said dogs and in subsequent portions of its movement to contact said bracket to rotate the shaft.

10. In combination with a shaft, means to latch the shaft against rotation, said means including a plurality of dogs geared together for motion in unison, and means for rotating the shaft, including a member having a part adapted to engage one of the dogs to move it and with it to move the other dog, to unlatch the shaft for rotation.

JOHN MAINLAND.

CERTIFICATE OF CORRECTION.

Patent No. 1,934,198.    November 7, 1933.

JOHN MAINLAND.

It is hereby certified that error appears in the printed specification of the above numbered patent requiring correction as follows: Page 2, line 89, claim 2, for "to direct" read directly; and that the said Letters Patent should be read with this correction therein that the same may conform to the record of the case in the Patent Office.

Signed and sealed this 12th day of December, A. D. 1933.

(Seal)    F. M. Hopkins

Acting Commissioner of Patents.